(12) United States Patent
Kilian-Kehr

(10) Patent No.: US 7,269,732 B2
(45) Date of Patent: Sep. 11, 2007

(54) SECURING ACCESS TO AN APPLICATION SERVICE BASED ON A PROXIMITY TOKEN

(75) Inventor: Roger Kilian-Kehr, Darmstadt (DE)

(73) Assignee: SAP Aktiengesellschaft, Walldorf (DE)

( * ) Notice: Subject to any disclaimer, the term of this patent is extended or adjusted under 35 U.S.C. 154(b) by 762 days.

(21) Appl. No.: 10/454,824

(22) Filed: Jun. 5, 2003

(65) Prior Publication Data

US 2004/0250074 A1    Dec. 9, 2004

(51) Int. Cl.
*H04L 9/00* (2006.01)
(52) U.S. Cl. .............. 713/172; 713/150; 713/168; 713/169; 713/185; 726/9; 726/20; 709/225; 709/229
(58) Field of Classification Search ............. 726/9, 726/20; 380/270; 713/172, 185, 150, 169, 713/68; 709/225, 229
See application file for complete search history.

(56) References Cited

U.S. PATENT DOCUMENTS

| | | | | |
|---|---|---|---|---|
| 5,638,444 | A * | 6/1997 | Chou et al. .............. | 380/284 |
| 6,088,450 | A * | 7/2000 | Davis et al. .............. | 713/182 |
| 6,175,922 | B1 * | 1/2001 | Wang .............. | 713/182 |
| 6,570,610 | B1 | 5/2003 | Kipust | |
| 6,999,589 | B2 * | 2/2006 | Cato et al. .............. | 380/270 |
| 7,107,246 | B2 * | 9/2006 | Wang .............. | 705/51 |
| 2003/0005300 | A1 * | 1/2003 | Noble et al. .............. | 713/172 |
| 2004/0103312 | A1 * | 5/2004 | Messerges et al. .......... | 713/201 |

FOREIGN PATENT DOCUMENTS

| | | |
|---|---|---|
| EP | 1 283 474 A1 | 2/2003 |
| WO | WO01/43129 A1 | 6/2001 |

OTHER PUBLICATIONS

"802.11," http://www.webopedia.com/TERM/8/802_11.html, printed from the Internet Apr. 10, 2003, 3 pgs.

(Continued)

*Primary Examiner*—Kim Vu
*Assistant Examiner*—Beemnet W Dada
(74) *Attorney, Agent, or Firm*—Fish & Richardson P.C.

(57) ABSTRACT

A system for providing secured access to an application service includes a security token that couples to the application service. The security token performs a first element of a cryptographic technique, such as, for example, encryption or decryption. A proximity token is provided that is associated with the security token. The proximity token performs a second element of the cryptographic technique to validate a communication between the application service and the security token. The proximity token is operable to validate the communication only when the proximity token is located within a predetermined validation distance from the security token or the application service. The security token may perform the first element of the cryptographic technique to verify that the proximity token has validated the communication between the application service and the security token. The system may be configured to provide secured access to the application service when the proximity token validates the communication and to prevent secured access to the application service when the proximity token does not validate the communication.

24 Claims, 12 Drawing Sheets

OTHER PUBLICATIONS

"Bluetooth," http://www.webopedia.com/TERM/b/bluetooth.html, printed from the Internet Apr. 10, 2003, 2 pgs.

Burns, Jim, "Selecting an Appropriate EAP Method for Your Wireless LAN," http://www.meetinghousedata.com/MDC_EAP_White_Paper.pdf, printed from the Internet Apr. 10, 2003, 8 pgs.

Chait, Michael, "Why Won't My Wireless Cell Phone Talk to My Xbox?" http://www.internetnews.com/wireless/article.php/1457431, printed from the Internet Apr. 10, 2003, 3 pgs.

Dashevsky, Jane, et al., "SIM Trust Parameters: Mobile Service Technologies," ftp://download.intel.com/labs/wireless/download/sim.pdf, printed from the Internet Apr. 10, 2003, copyright 2003 Intel Corporation, 59 pgs.

"Embedded Intel® Architecture Reference Design for Communic Appliances," http://www.intel.com/platforms/applied/eiacomm/papers/apprefdes.htm, printed from the Internet Apr. 10, 2003, 4 pgs.

Foerster, Jeff, et al., "Ultra-Wideband Technology for Short- or Medium-Range Wireless Communications," http://developer.intel.com/technology/itj/q22001/pdf/art_4.pdf, *Intel Technology Journal*, May 8, 2001, 11 pgs.

Geier, Jim, "Minimizing WLAN Security Threats," http://www.80211-planet.com/tutorials/article.php/1457211, printed from the Internet Apr. 10, 2003, 4 pgs.

"IBM Research: Personal Area Network," http://domino.research.ibm.com/comm/bios.nsf/pages/pan.html, printed from the Internet Apr. 10, 2003, 2 pgs.

"Microsoft Windows 2000 Server: Smart Card Logon," http://www.microsoft.com/singapore/downloads/sclogonwp.document, printed from the Internet Apr. 10, 2003, 21 pgs.

Monson, Heidi, "Bluetooth Technology and Implications," http://www.sysopt.com/articles/bluetooth/, printed from the Internet Apr. 10, 2003, 3 pgs.

Monson, Heidi, "Bluetooth Technology and Implications," http://www.sysopt.com/articles/bluetooth/index2.html, printed from the Internet Apr. 10, 2003, 4 pgs.

Pesonen, Lauri, "GSM Interception," http://www.dia.unisa.it/ads.dir/corso-security/www/CORSO-9900/a5/Netsec/netsec.html, printed from the Internet Apr. 8, 2003, 16 pgs.

"Shared Wireless Access Protocol," http://www.webopedia.com/TERM/S/Shared_WAP.html, printed from the Internet Apr. 10, 2003, 1 pg.

Smart Card Alliance, "Secure Personal Identification Systems: Policy Process and Technology Choices for a Privacy-Sensitive Solution," http://www.smartcardalliance.org/pdf/alliance_activities/Secure_ID_White_Paper.pdf, printed from the Internet Apr. 10, 2003, copyright 2002 Smart Card Alliance, Inc., 15 pgs.

Sorenson, Dustin, "Smart-Card Devices and Applications," http://itpapers.zdnet.com/thankyou.aspx?&sortby=comp&scid=423&docid=11252&view=11252, printed from the Internet Apr. 10, 2003, 11 pgs.

"WAP," http://www.webopedia.com/TERM/W/WAP.html, printed from the Internet Apr. 10, 2003, 3 pgs.

* cited by examiner

SECURING ACCESS TO AN APPLICATION SERVICE BASED ON A PROXIMITY TOKEN

TECHNICAL FIELD

The disclosure relates to securing access to an application service.

BACKGROUND

A mobile phone or other bearer device may be secured using a security token such as a smart card to authenticate an owner of the smart card. Before the smart card is activated to authenticate the owner, the smart card may require the owner to communicate a secret such as a personal identification number (PIN) shared between the smart card and the owner. To avoid burdening the owner, the smart card may require the owner only to provide the PIN at certain extended intervals. In many cases, the smart card may remain activated for hours, weeks, or even months. If the bearer device is stolen while the smart card is activated, the thief may use the stolen bearer device to access or charge secure services using the activated smart card to authenticate himself as the owner.

SUMMARY

In one general aspect, a system for providing secured access to an application service includes a security token that communicates with the application service. The security token performs a first element of a cryptographic technique. A proximity token is provided that is associated with the security token. The proximity token performs a second element of the cryptographic technique to validate a communication between the application service and the security token. The proximity token is operable to validate the communication only when the proximity token is located within a predetermined validation distance from the security token or the application service.

Implementations may include one or more of the following features. For example, the security token may use the first element of the cryptographic technique to verify that the proximity token has validated the communication between the application service and the security token. The cryptographic technique may include symmetric and/or asymmetric cryptographic methods. The first and second elements of the cryptographic technique may be complementary, and may be, for example, encryption and/or decryption techniques. The cryptographic technique also may include a digital signature technique and/or a digital envelope technique.

To validate the communication, the proximity token may communicate directly with the security token. The system may be configured to provide secured access to the application service when the proximity token validates the communication and to prevent secured access to the application service when the proximity token does not validate the communication.

The proximity token may include a message generating circuit to generate a proximity message using the second element of the cryptographic technique. The message generating circuit may broadcast the proximity message to validate the communication, and the range of the broadcast may be such that the message is only received when the proximity token is within the predetermined validation distance from the application service or the security token.

A communication circuit may engage the proximity token as a conduit to the communication between the application service and the security token in order to validate the communication when the proximity token is within the predetermined validation distance. For example, a secured output circuit of the security token may use encryption to produce a secured output. The communication circuit may decrypt the secured output using a recovery circuit to produce a validated output that is communicated to the application service or the security token.

Alternatively, a validated command circuit of the communication circuit may encrypt a command of the application service to the security token to produce a validated command. The security token may include a command recovery circuit to recover the command by decrypting the validated command. Again, for validation, the communication circuit communicates both the command and the validated command for receipt only when the proximity token is within the predetermined validation distance from the application service or the security token.

The security token may include a smart card with a secure execution circuit and a secure storage circuit. The secure execution circuit executes aspects of the cryptographic technique and the secure storage circuit stores, for example, a cryptographic key of the cryptographic technique.

The proximity token may include a mobile device or a fixed device. Moreover, the proximity token itself may include a security token, such as, for example, a smart card. The proximity token may use a wireless communication circuit to communicate with the application service using a short-range wireless technology. In addition, the application service may include physically separated parts, such as, for example, a bearer device (e.g., a mobile phone) and an external service (e.g., a mobile phone network).

These general and specific aspects may be implemented using a method, a system, or a computer program, or any combination of systems, methods, and computer programs. Other features will be apparent from the following description, including the drawings, and from the claims.

DESCRIPTION OF DRAWINGS

Like reference symbols in the various drawings indicate like elements.

DETAILED DESCRIPTION

Figure 1:
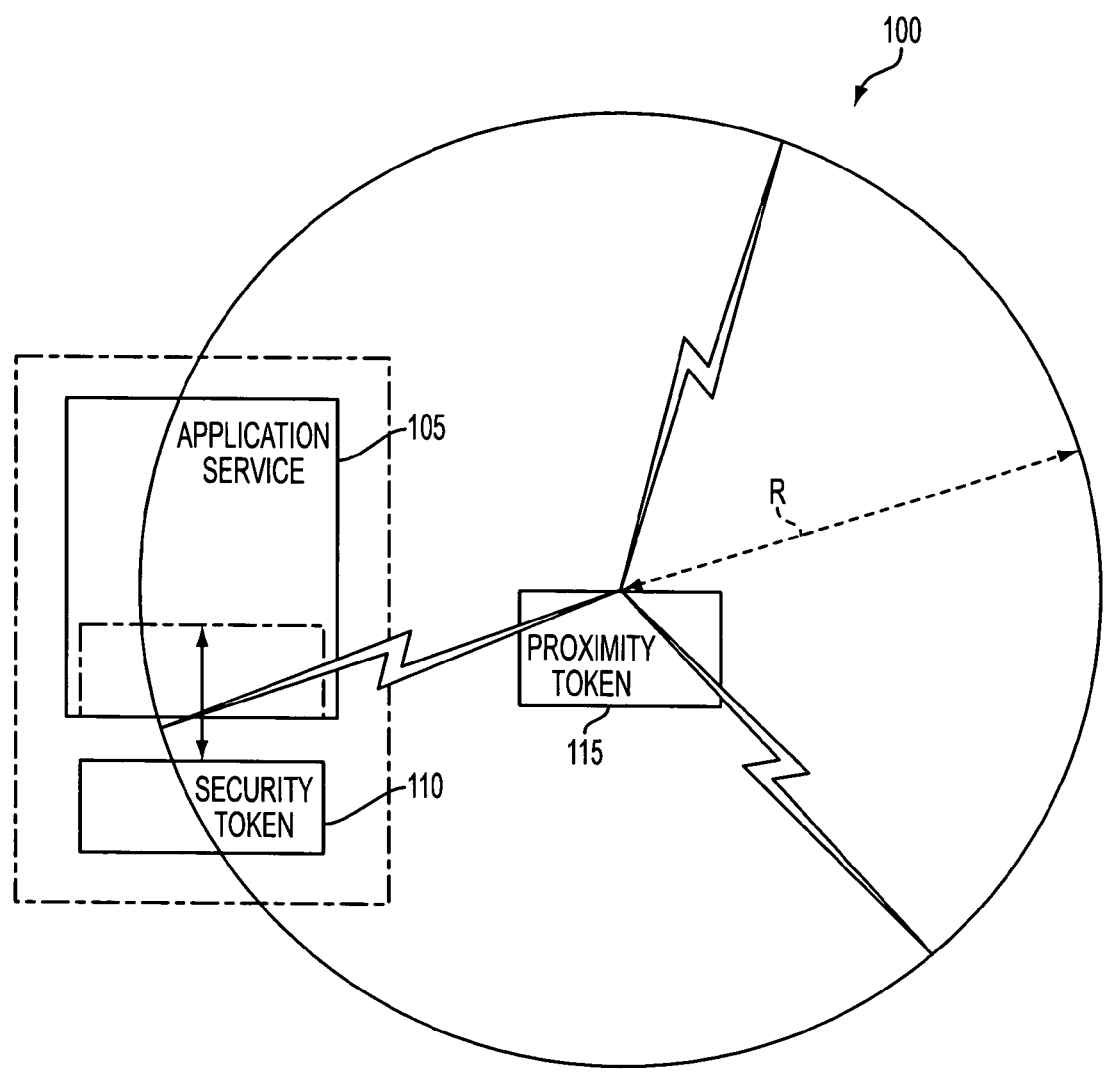
FIG. 1 is a schematic diagram of a system for providing secured access to an application service using a proximity token.

Referring to FIG. 1, a generalized system 100 provides secured access to an application service 105 using a security token 110 and a proximity token 115. The proximity token 115 validates a communication between the application service 105 and the security token 110 to secure access to the application service 105. The security token 110 may verify the validation before access to the application service 105 is provided. Exemplary components of the system 100 are described in greater detail below.

The application service 105 generally may include a device, a system, and/or a piece of code that relies on a security token (e.g., security token 110) to provide functions of secure storage and/or secure execution. For example, the application service 105 may include a mobile device, such as a mobile telephone, a personal digital assistant (PDA), a pen-based computer, or a notebook computer. The application service 105 also may include a fixed device, such as, for example, a desktop computer, a workstation, an automated teller machine (ATM), or a building security system. The application service 105 may include an enterprise client, a Web browser (e.g., a SIM (subscriber identity module) toolkit browser configured to integrate with a Giesecke & Devrient STARSIM browser system of the security token 110), an email client, a synchronization client (e.g., a calendar synchronization client or a task list synchronization client), an electronic purse or wallet, an instant messaging (IM) client, a business productivity application (e.g., a word processor or a spreadsheet program), and/or an operating system or operating system kernel residing on a mobile device.

The application service 105 may include or access additional services. For example, the application service 105 may include or access an application server (e.g., a web application server (WAS) such as SAP WAS version 6.20) configured to communicate with a database service, such as, for example, a reliable database management system (RDBMS) or an SAP R/3 system. The database service may include, for example, enterprise information related to enterprise services, users, and/or customers. In addition, the application service 105 may include a CRM service, an enterprise resource planning (ERP) service, an email service, an accounting service, a resource management service, a synchronization service (e.g., a calendar synchronization service, a task list synchronization service), a print service, a file access service, an instant messaging (IM) service, an operating system, an operating system kernel, an authentication service, an authorization service, and/or any combination of these or other services.

The application service 105 further may include various mechanisms for delivering voice and/or non-voice data, such as, for example, the short message service (SMS), the wireless application protocol (WAP), the transport connection protocol (TCP), the Internet protocol (IP), the World Wide Web, one or more local area networks (LANs), one or more wireless LANs (WLAN), and/or one or more wide area networks (WANs). The application service 105 also may include analog or digital wired and wireless telephone networks, e.g., public switched telephone networks (PSTN), integrated services digital networks (ISDN), various types of digital subscriber lines (xDSL), advance mobile telephone service (AMPS), global system for mobile communications (GSM), general packet radio service (GPRS), code division multiple access (CDMA), wideband CDMA (WCDMA), universal mobile telecommunications system (UMTS), radio, cable, satellite, and/or other delivery mechanisms for carrying voice or non-voice data.

The security token 110 generally may perform a secure storage function and a secure execution function. The secure storage and secure execution functions of the security token 110 may be used to provide, for example, confidentiality, user authentication, application authentication, transaction authentication, and/or nonrepudiation. The security token 110 may control access to the application service 105 by verifying that communications with the application service 105 are validated by the proximity token. For example, the security token 110 may verify, generate, or interpret secure messages (e.g., a secure message validated by the proximity token 115) based on data encryption techniques, including using basic data encryption, a digital signature, and/or a digital envelope. Using the secure storage and secure execution functions of the security token 110, a secret cryptographic key may be stored and used entirely within the token. As a result, a third party eavesdropper is prevented from listening to communications of the security token 110 to intercept the secret cryptographic key.

For additional security, the security token 110 may require that a user provide an access token (e.g., a personal identification number (PIN), a password, or a biometric indicator) to enable the security token 110. To provide increased security from theft, the security token 110 may be configured to lock itself down after a predetermined number of failed access attempts. The security token also may include an internal clock and may be configured, for example, to lock down after a predetermined number of failed access attempts within a predetermined period of time.

The security token 110 may be configured to require validation of all or only some communications with the application service 105. For example, the application service 105 may be configured to provide both secured and non-secured services, and specific communication types may be associated with each. A non-secured service might include, for example, access to an emergency phone number such as 911, or to a service for which users are not charged. The security token 110 may be configured not to require validation of communications of a type associated with a non-secured service of the application service 105.

The security token 110 also may be configured to employ one or more protocols to guarantee freshness of a received command. For example, a replay counter technique may be used to prevent an eavesdropper from intercepting a validated command and then submitting the validated but no-longer fresh command to the security token 110 to access the application service 105.

To provide secure storage and secure execution, the security token 110 may include specialized security hardware and software that may have a physical identity separate from the application service 105. For example, the security token 110 may include its own memory and processor within a secured physical casing. Secured software and data (e.g., cryptographic algorithms and cryptographic keys and certificates) may be stored and executed using the memory and processor secured within the physical casing to prevent observation or modification by an eavesdropper. The security token 110 may include, for example, a Giesecke & Devrient STARSIM browser system that may integrate with a SIM toolkit browser of the application service 105. The security token 110 also may include a random number generator (RNG) and/or an internal clock mechanism.

In one such implementation, the security token 110 includes a smart card or other suitable processor and/or memory card (e.g., a universal serial bus (USB) token, a GSM SIM, and/or a UMTS SIM (USIM)) that is capable of providing secure storage and secure execution. The smart card may be defined, for example, by standards such as the International Organization for Standardization (ISO) 7816-X, the ISO and International Electrotechnical Commission (IEC) 14443-1 specification, the European Telecommunication Standards Institute specification for GSM SIMs, and/or the Europay International, Master Card International, and Visa International (EMV) specification for payment systems. The smart card may decrypt received secure messages, encrypt requests or replies to form outgoing secure messages, and may communicate with the application service 105 using the secure messages. The secure messages may include voice and/or non-voice data.

In another aspect, the security token 110 may be included as part of the application service 105 and may be implemented using resources of the application service through tamper resistant software (TRS) that is resistant to observation and modification. The TRS may employ interleaving of its operations, and the TSR code may be self-encrypting, self-decrypting, and/or self-modifying. The TRS may be configured to store secrets dispersed through multiple memory structures, and to process those secrets only through multiple operations. Each TSR implementation may include a unique code sequence and/or cryptographic key, and the correct performance of a TSR code sequence may depend on the mutually correct execution of many other TSR code sequences.

The security token 110 may employ a one-way cryptographic method (i.e., the encrypted output cannot be decrypted) that, for example, may be useful for authentication or to verify a validation. A one-way cryptographic function produces a fixed size number (e.g., a hash value) for an input of any length, where, additionally, it is infeasible computationally to determine the input from the hash value. Slightly different inputs to a one-way cryptographic function typically will produce substantially different outputs. One-way cryptographic functions include, for example, the secure hash algorithms (e.g., SHA-1, or SHA-256) and the message digest algorithms (e.g., MD4, MD5, or Ripe-MD).

The security token 110 also may employ two-way cryptographic methods (i.e., the encrypted outputs can be decrypted) that are symmetric and/or asymmetric. In a symmetric cryptographic method, a shared key is employed that is used both to encrypt and to decrypt a message. The shared key may be used once to secure a given message and discarded, or the security token 110 may store the shared key for repeated use. In either event, the shared key may be communicated to the application service 110 using conventional key exchange methods. Symmetric cryptographic methods include, for example, the data encryption standard (DES), the 3DES (triple DES), the Blowfish encryption algorithm, the international data encryption algorithm (IDEA), and/or the advanced encryption standard (AES).

In an asymmetric cryptographic method, (e.g., the Rivest, Shamir, and Adelman (RSA) method, elliptic curve cryptography (ECC), digital signature algorithm (DSA), or Elgamal cryptography), a key-pair is used to encrypt and decrypt a message. The key-pair includes a public key for encrypting a message (but that provides no decryption benefit) and an associated private key for decrypting the message. Asymmetric cryptographic methods also may be used to create a digital signature. The digital signature may authenticate that a message author actually is the person or device that the message author claims to be and that the message has not been modified after being sent. Similar to encryption, a private key is used to create a digital signature while a message recipient uses an associated public key to authenticate the digitally signed message. The security token 110 may retain the private key, but, for example, may make the public key available to the application service 105 through publication. A public key infrastructure (PKI) may certify to the application service 105 that the public key associated with the message corresponds to the source claimed by the message. The PKI fills a role similar to that of a notary public who witnesses the correct identity of a signer of a paper document. The PKI may include, for example, a certification authority or a web of trust.

The proximity token 115 generally may include, for example, any device, system, and/or piece of code configured to validate a communication between the application service 105 and the security token 110 occurring within a predetermined distance of the proximity token. To provide validation within the predetermined distance, the proximity token 115 may be configured to use a short-range wireless technology to communicate with the application service 105 and/or the security token 110. The application service 105, and/or the security token 110 also may be configured to communicate using short-range wireless technology. Short-range wireless technologies include, for example, Bluetooth, IEEE 802.11, ultra-wideband (UWB), shared wireless access protocol (SWAP), digital enhanced cordless telecommunications (DECT), GSM, UMTS, CDMA, WCDMA, IRDA (infrared data association) protocols, CDMA2000, time-division CDMA (TD-CDMA), HiperLAN2, HomeRF, or wide band frequency hopping (WBFH). Depending upon the protocol used, the short-range wireless technology may provide, for example, an effective communication range of about 10 meters or of about 100 meters. The proximity token 115 may be mobile or stationary, and may or may not communicate directly with the application service 105 or the security token 110.

In any event, the proximity token 115 provides secure execution and/or secure storage functions generally similar to those of the security token 110 already described. Moreover, the proximity token 115 may include a security token to provide, for example, secure storage and secure execution. For brevity, therefore, the description of the security token 110 is not repeated here, but is incorporated by reference. The proximity token 115 validates the communication between the application service 105 and the security token 110 using symmetric and/or asymmetric data encryption methods. The cryptographic methods of the proximity token 115 may be selected to operate seamlessly with the cryptographic methods of the security token 110.

To validate the communication between the application service 105 and the security token 110, the proximity token 105 may be engaged as a participant in that communication. The proximity token 115 may determine for itself an outer distance (e.g., validation distance R) at which validated communication may occur, and may refuse to validate a communication beyond that distance. For example, the proximity token 115 may determine a validation distance by adjusting a power at which the proximity token 115 broadcasts. In addition, or in the alternative, the proximity token 115 may determine the validation distance R based on a received power of a communication between the application service 105 and the security token 110.

One or more other services may be included in the components of system 100, and these components (hereinafter the system services) may be included as part of one or more other services. For example, the system services may include or be included in a general-purpose or a special-purpose computer (e.g., a personal computer, a PDA, or a device specifically programmed to perform certain tasks), a Local Area Network (LAN), and/or a Wide Area Network (WAN). The response to and execution of instructions received by any or all of the system services may be controlled by, for example, a program, a piece of code, an instruction, a device, a computer system, or a combination thereof, for independently or collectively instructing the services to interact and operate as described herein.

Figure 2:
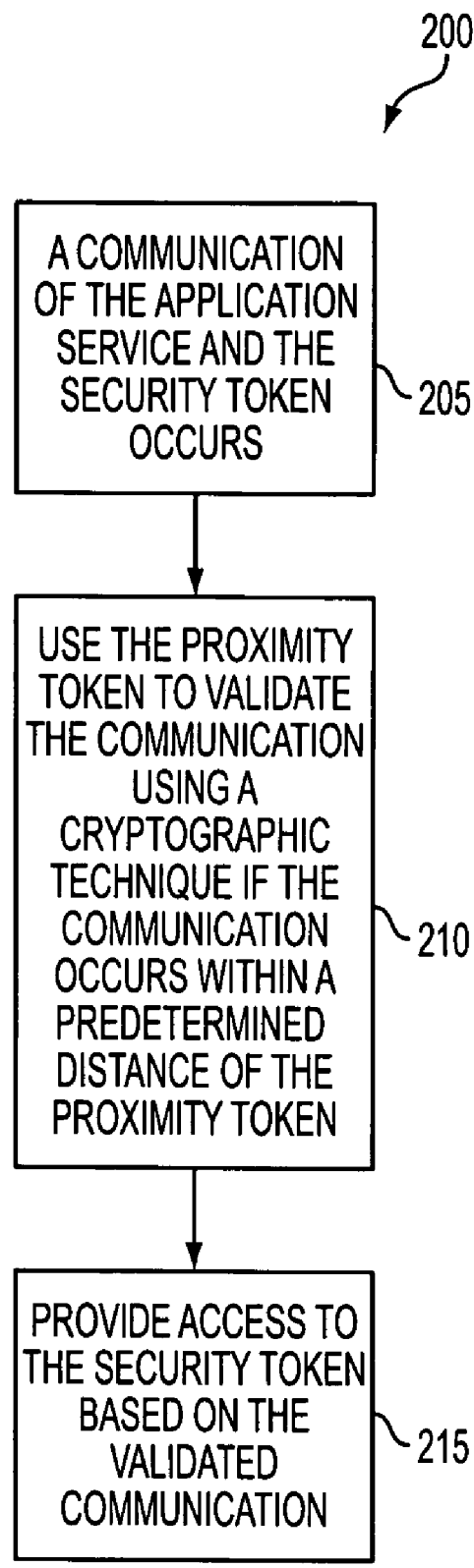
FIG. 2 is a flow diagram illustrating a process implementable by the system of FIG. 1.

FIG. 2 illustrates a systematic process 200 implementable by, for example, the system of FIG. 1. The application service 105 and the security token 110 may engage in a communication related to access of the application service 105 (step 205). Generally, any number of cryptographic techniques may be envisaged to validate the communication between the application service 105 and the security token 110. The proximity token 115 may use any appropriate cryptographic technique or combination of techniques to validate the communication within a predetermined distance of the proximity token 115 (step 210). Access then may be provided to the application service 105 based on the validated communication between the application service 105 and the security token 110 (step 215).

Figure 3:
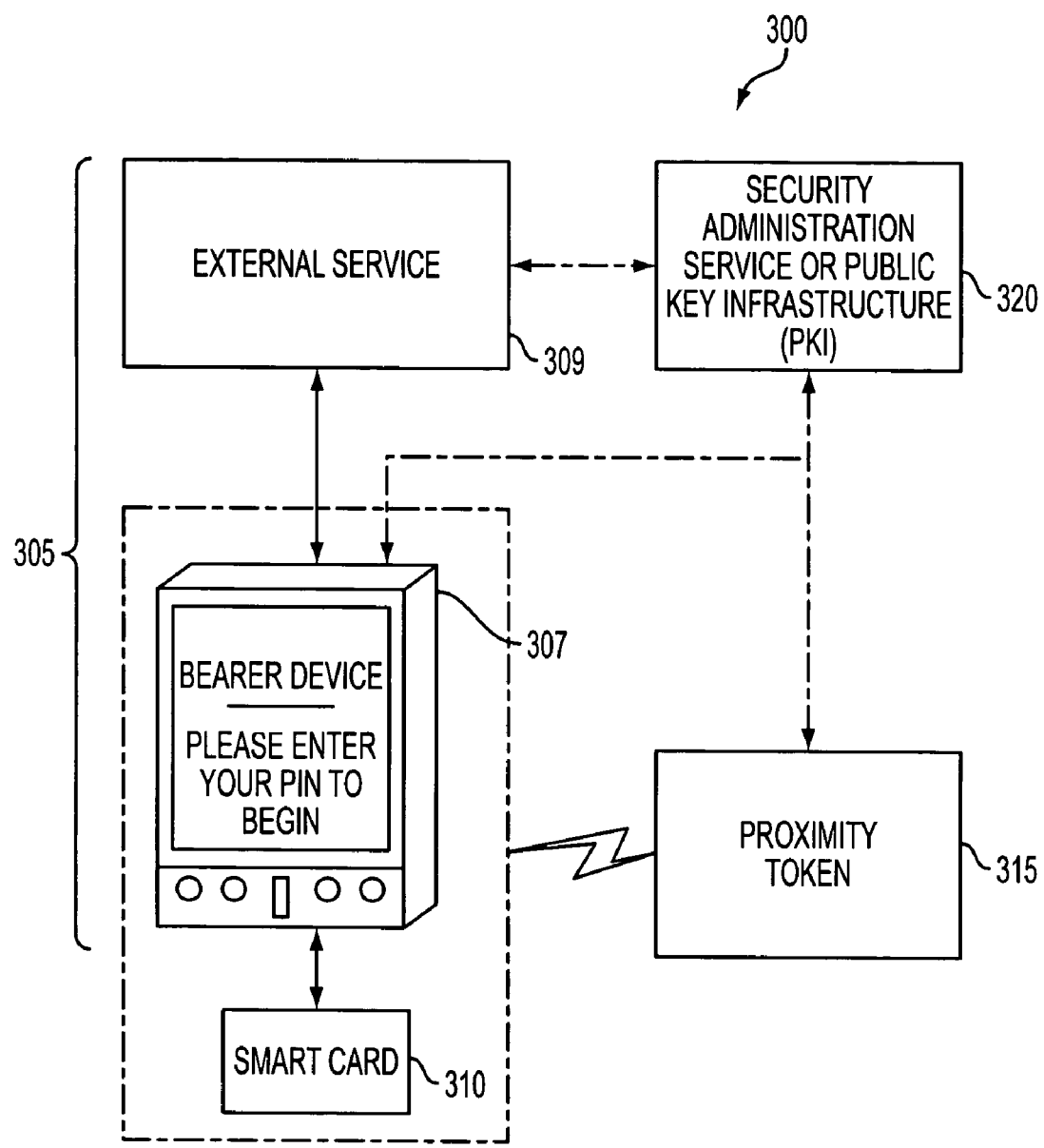
FIGS. 3-6 are schematic diagrams illustrating exemplary systems for providing secured access to an application service using a proximity token.

Referring to FIG. 3, a generalized system 300 secures access to an application service 305 using a smart card 310 and a proximity token 315. In general, system 300 is similar to system 100 of FIG. 1. The application service 305 is shown to include a bearer device 307 and an external service 309 that are configured to communicate together. The system 300 also may include an administrative service 320 configured to manage one or more aspects of a security infrastructure. For the sake of brevity, this description focuses on describing these additional aspects of system 300. Exemplary components of system 300 are described in greater detail below.

The application service 305 is analogous to the application service 105 of FIG. 1. However, application service 305 is shown to include a bearer device 307 and an external service 309. The bearer device 307 may include a mobile device or a fixed device. For example, the bearer device 307 may include a device such as a telephone, a pen-enabled computer, a PDA or mobile telephone, a notebook computer, and/or a desktop computer. The bearer device 307 may include a hardware device configured physically to receive the smart card 310 and to communicate with the smart card 310. The bearer device 307 also may include, for example, a Web browser, an email client, a synchronization client (e.g., a calendar synchronization client or a task list synchronization client), an IM client, a business productivity application (e.g., a word processor or a spreadsheet program), an operating system or operating system kernel, and/or a virtual private network (VPN) (e.g., based on the IP security (IPsec) protocol).

The external service 309 may include various mechanisms for communicating voice and/or non-voice data with the bearer device 307. Those mechanisms may include, for example, analog or digital wired and wireless telephone networks (e.g., PSTN, ISDN, xDSL, AMPS, GSM, GPRS, CDMA, WCDMA, and UMTS), radio, cable, satellite, and/or other delivery mechanisms for carrying voice or non-voice data. Other mechanisms may include SMS, WAP, TCP, IP, the World Wide Web, one or more LANs (e.g., a WLAN) and/or one or more WANs.

The external service 309 may employ the communication mechanisms described above to provide the bearer device 307 with access to back-end services, and/or other local application services. For example, the external service 309 may include or access a web application server (WAS) (e.g., SAP WAS version 6.20), configured to communicate with a database system, such as, for example, a reliable database management system (RDBMS) or an SAP R/3 system. The database system may include, for example, enterprise information related to enterprise services, users, and/or customers. The external service 309 may include a CRM system, an enterprise resource planning (ERP) system, an email service, a business-process system (e.g., a work-flow management system or an enterprise/employee portal), an accounting service, a resource management service, a synchronization service (e.g., a calendar synchronization service or a task list synchronization service), a print service, a file access service, an instant messaging (IM) service, an operating system, an operating system kernel, an authentication service, an authorization service, and/or any combination of these or other services. Additionally, or in the alternative, the external service 309 may be configured to provide communication with a user of another mobile device.

The application service 305 may be arranged to operate within or in concert with one or more other systems, such as, for example, one or more LANs, WLANs, and/or one or more WANs.

The administrative service 320 may manage one or more aspects related to securing access to the application service 305. The administrative service 320 may include, for example, a security management service configured to communicate with one or more devices of the system 300 using an end-to-end secured communication. The security management service may store, alter, validate, revoke, or generate security credentials, such as certificates or cryptographic keys used by the system 300. The security management service may include a public key infrastructure (PKI) configured to certify that a public key associated with a communication corresponds to an alleged source of the communication. The administrative service 320 also may include a policy management service configured to effectuate a state change in a device of system 300 based on a change in a security-related policy (e.g., a security-related policy of an enterprise system).

One or more other services may be included in the components of administrative service 320, and/or these components (hereinafter the system services) may be included as part of one or more other services. For example, the system services may include or be included in a general-purpose or a special-purpose computer (e.g., a personal computer, a mobile device, or a device specifically programmed to perform certain tasks), at least one Local Area Network (LAN), and/or at least one Wide Area Network (WAN). Either way, the response to and execution of instructions received by any or all of the system services may be controlled by, for example, a program, a piece of code, an instruction, a device, a computer system, or a combination thereof, for independently or collectively instructing the services to interact and operate as described herein.

Figure 4:
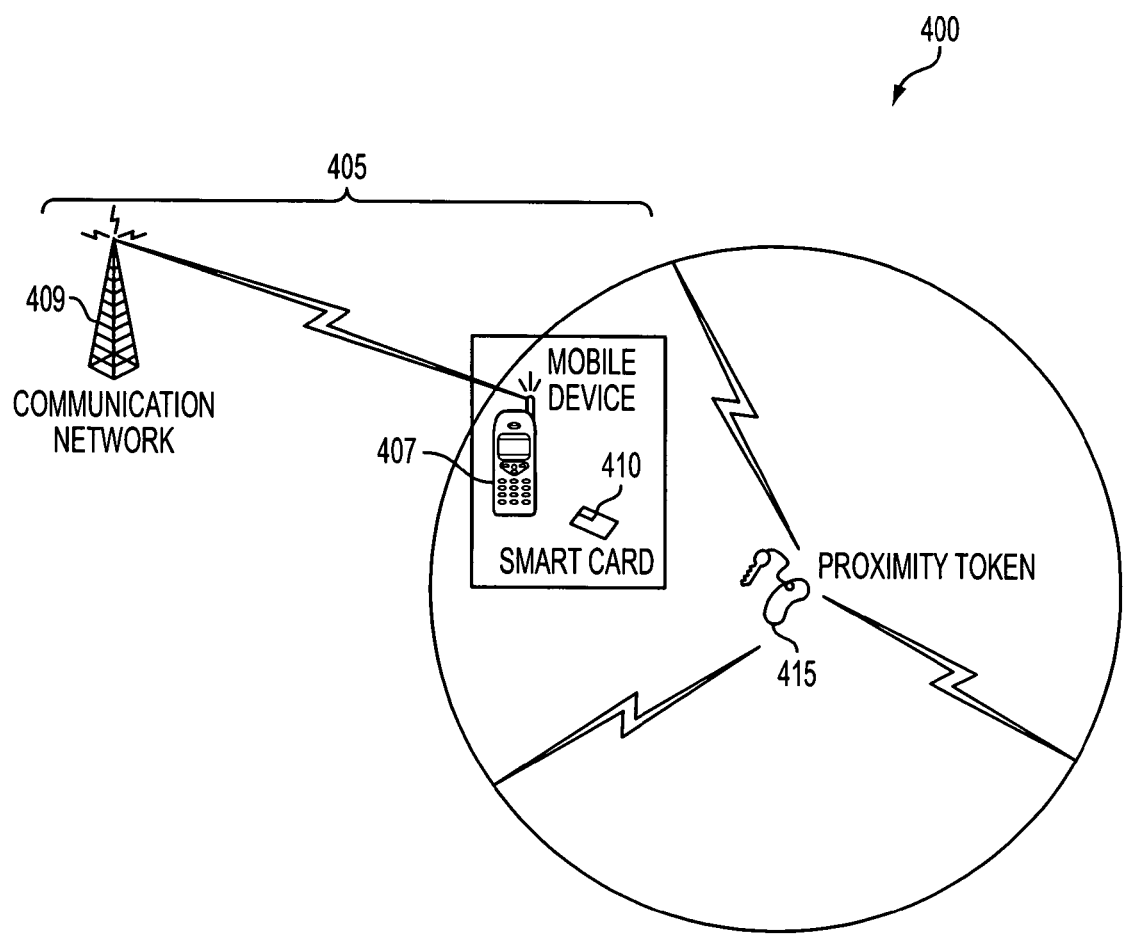
Figure 5:
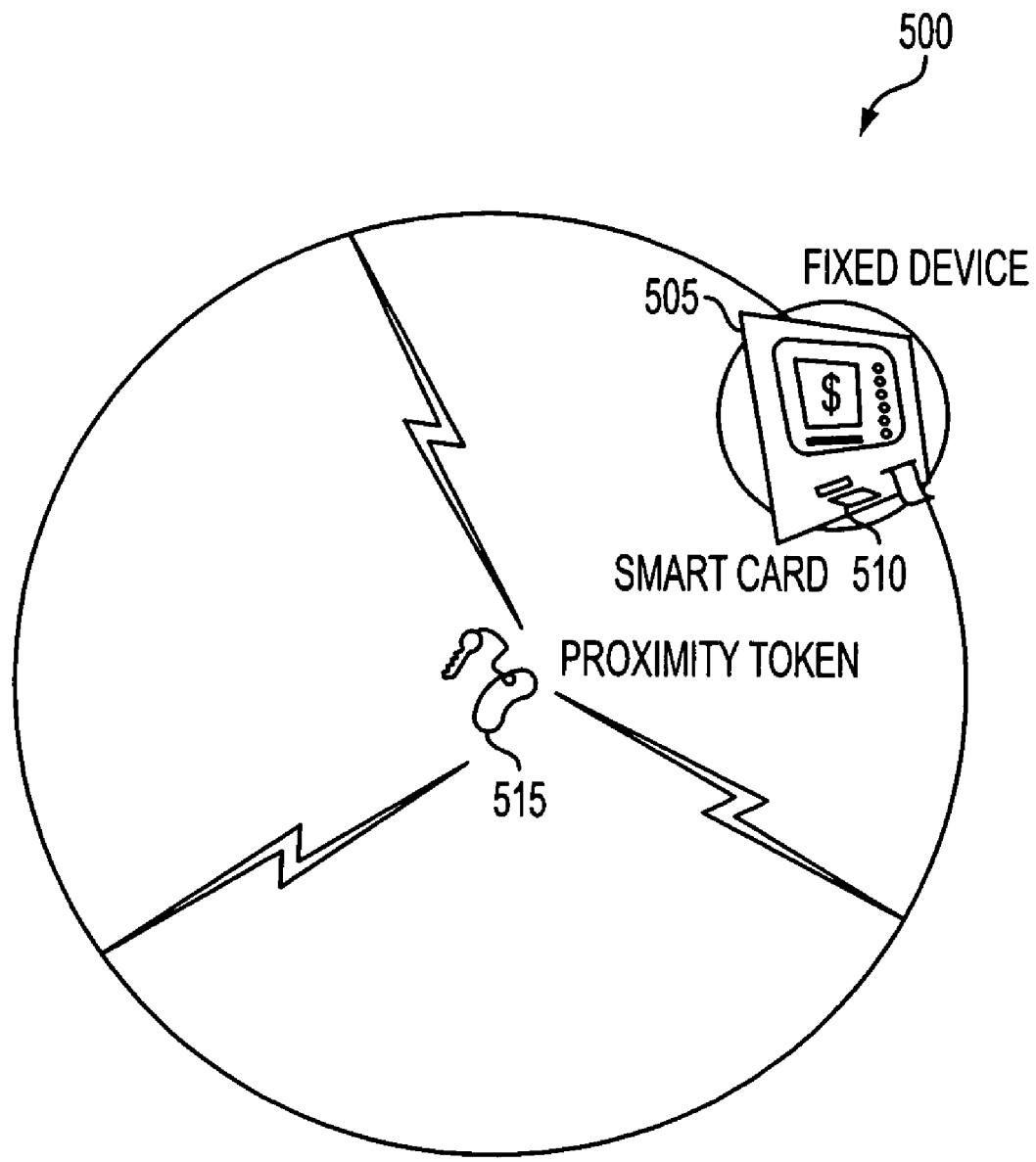

FIGS. 4 and 5 illustrate systems similar generally to the system of FIG. 3. For brevity, the systems of FIGS. 4 and 5 are described to omit excessive similar detail.

Referring to FIG. 4, a system 400 is provided in which the local application service comprises a mobile phone 407, and the remote application service comprises a mobile phone network 409. The mobile phone 407 is configured to function based on a smart card 410. The proximity token 415 of system 400 is structured as a small mobile device attachable, for example, to a keychain. Because of the small size of the proximity token 415, an owner of the mobile phone 407 may carry the proximity token 415 in a pocket or otherwise. Hence, the mobile phone 407 and the smart card 410 are ensured to be within the validation distance of the proximity token 415 when the user desires to use the mobile phone 407. On the other hand, theft of the mobile phone 407 and smart card 410 likely will remove them beyond the validation distance of the proximity token 415. The thief, therefore, will be unable to use the mobile phone 407 to charge calls to the owner, or to otherwise access the mobile phone network 409 as the smart card owner.

FIG. 5 illustrates a system 500 in which the application service includes a fixed ATM 505, and the smart card 510 may be used as an ATM card or an electronic purse. The proximity token 515 is added to system 500 to provide security against unauthorized access of the ATM, for example, by a thief who has stolen the smart card 510, and who may have obtained an associated password or PIN.

Figure 6:
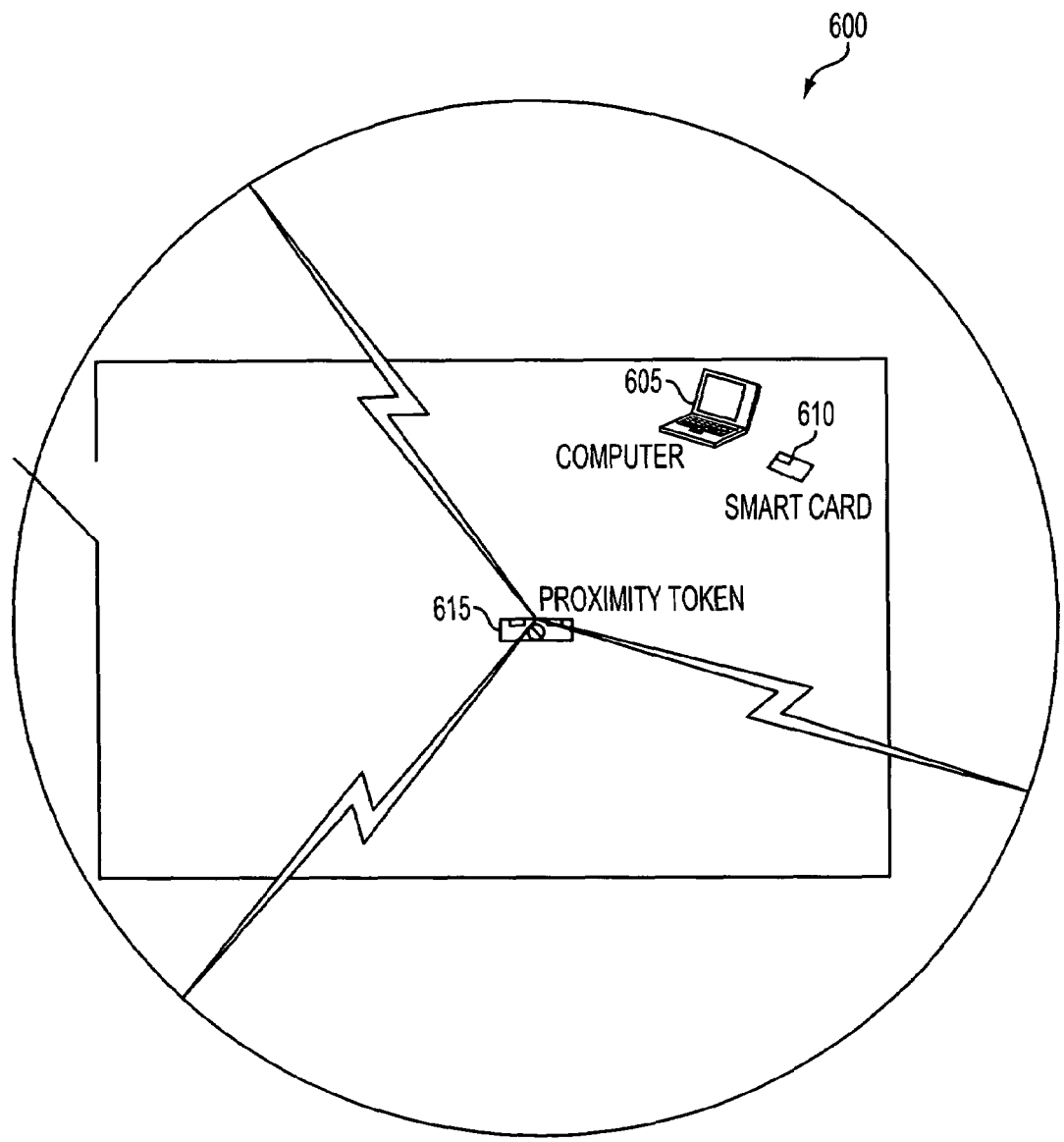

Referring to FIG. 6, a system 600 is illustrated in which the proximity token 615 is fixed rather than mobile. System 600 is configured to limit further the geographic region in which access to the application service (e.g., computer 605) may be obtained. For example, a user may be provided access to confidential encrypted documents stored on the computer 605 only while the user accesses the confidential documents within the geographic region defined by the validation range of the fixed proximity token 615. The validation range of the fixed proximity token 615 may be constrained additionally by electromagnetically shielding a building or a room (e.g., a confidential document review room) that includes the fixed proximity token 615.

The fixed proximity token 615 also may be used to validate access to a sensitive system (e.g., a corporate enterprise system) in instances in which computer 605 is used to access the enterprise system from an approved corporate facility or campus. However, should the user stray from that corporate facility or campus and beyond the validation range of the fixed proximity token 615, then access to the sensitive corporate enterprise system would not be validated and would be denied.

FIGS. 7-10 illustrate data flow diagrams showing processes that may be used to implement the systems of FIGS. 3-6. The diagrams illustrate the proximity token as a conduit to the communication between the application service and the smart card.

Figure 7:
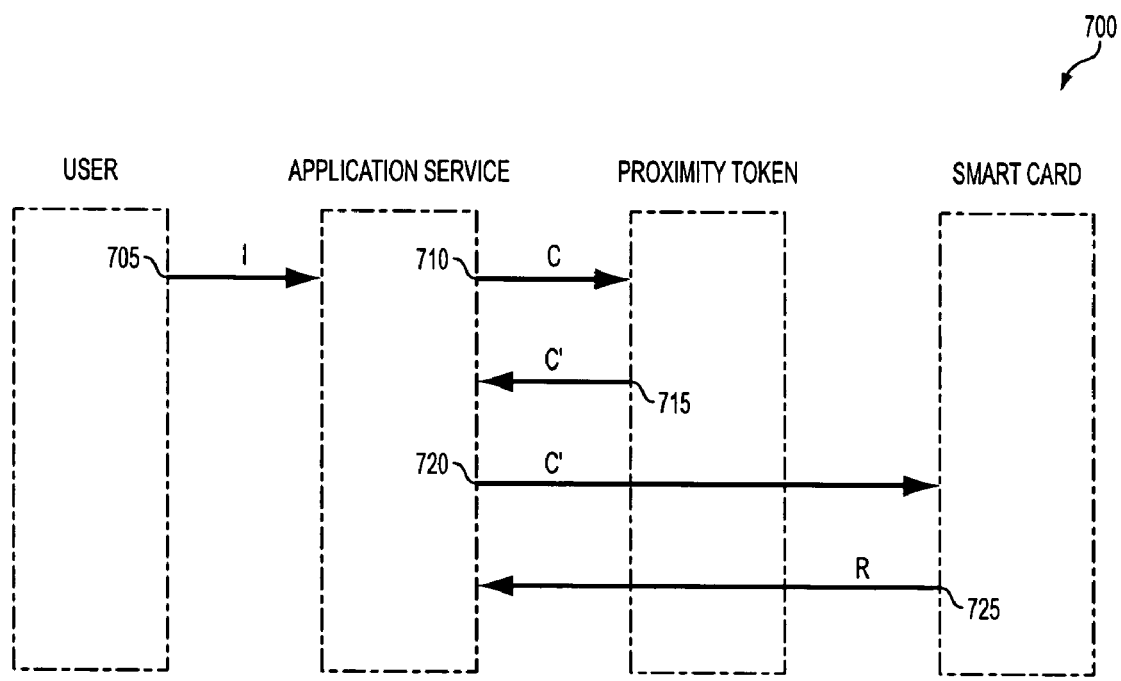
FIGS. 7-11 are data flow diagrams illustrating processes implementable by the systems of FIGS. 3-6.

Referring to FIG. 7, a process 700 is illustrated in which a user may provide an instruction I to the application service (step 705). The application service may generate a command C based on I, or, alternatively, based on its own initiative or upon some other input, and may communicate the command C to the proximity token (step 710). The proximity token may transform the command C using a cryptographic technique to generate C'. For example, the proximity token may digitally sign the command C, may encrypt the command C, and/or may apply a hashing algorithm to the command C. In this manner, the proximity token validates the communication, and then passes the transformed command C' back to the application service (step 715). The application service then may provide the transformed command C' to the smart card (step 720). The smart card may employ a cryptographic technique upon the transformed command C' to obtain the original command C (e.g., using a cryptographic key shared by the proximity token or a public key of the proximity token), thus verifying that the proximity token validated the communication. After recovering the original command C, the smart card may execute the command C to produce a result R, that then is provided to the application service (step 725).

Figure 8:
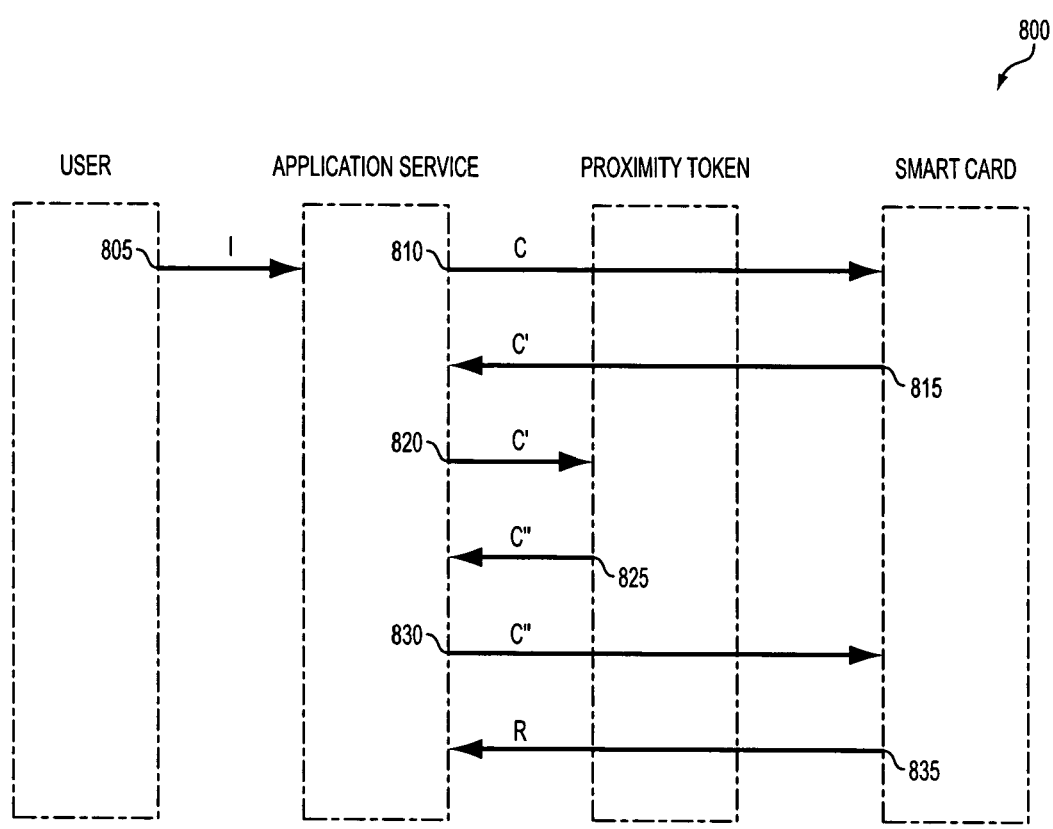

The process of FIG. 8 is similar, but with added steps designed also to authenticate the smart card to the proximity token. Again, a user provides an instruction I to the application service (step 805). The application service generates a command C based on the input I, or, alternatively, based on its own initiative or upon some other input, and communicates the command C to the smart card (step 810). The smart card transforms the command C using a cryptographic technique to generate C' and communicates the modified command C' to the application service (step 815). The application service provides the modified command C' to the proximity token, which validates participation of the smart card using a cryptographic key shared by the smart card or a public key of the smart card (step 820). To validate the communication, the proximity token transforms C' to C" using a cryptographic technique, and communicates C" to the application service (step 825). The application service communicates C" to the smart card (step 830). The smart card employs a cryptographic technique upon the transformed command C" to obtain C', thus verifying that the proximity token validated the communication (e.g., using a cryptographic key shared by the proximity token or a public key of the proximity token). As it was the smart card initially that formed C' from C, the smart card may reverse the process and recover C from C' using its own cryptographic keys. After recovering the original command C, the smart card executes the command C to produce a result R, that the smart card provides to the application service (step 835).

Figure 9:
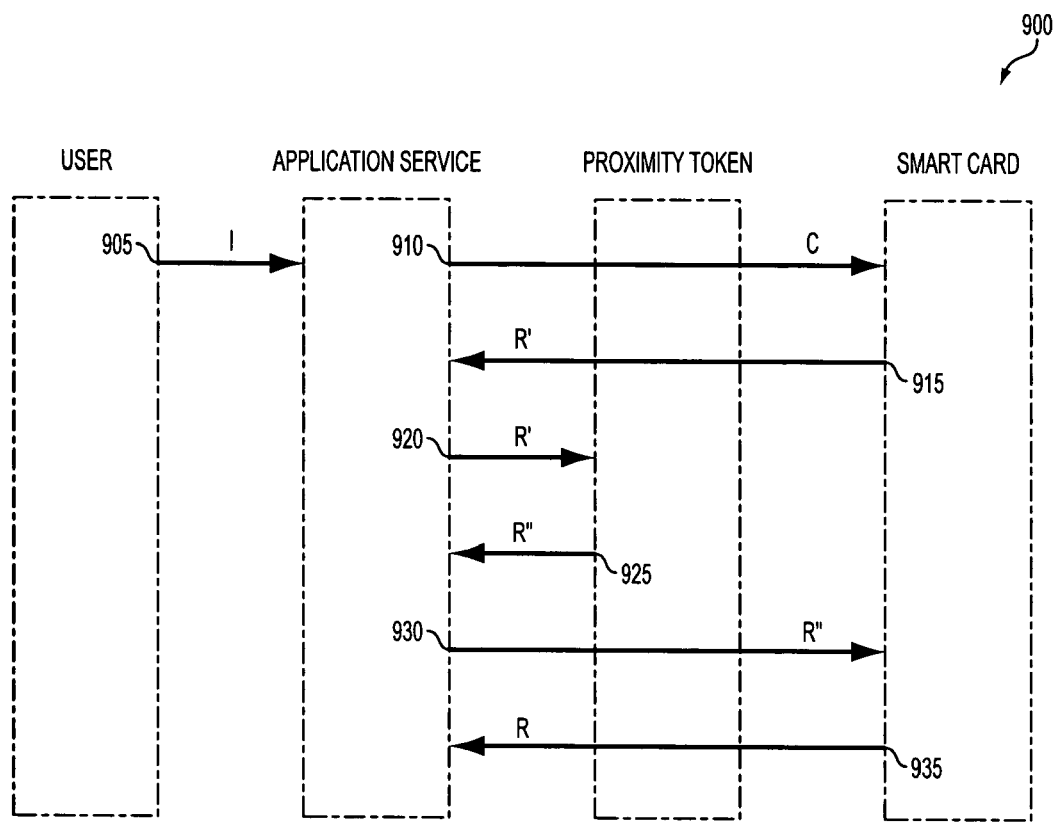

Referring to FIG. 9, a process 900 is illustrated in which a user may provide an instruction I to the application service (step 905). The application service generates a command C based on the instruction I, or, alternatively, based on its own initiative or upon some other input, and communicates C to the smart card (step 910). The smart card executes the command C and generates a response R', modified from R using an encryption technique, that the smart card communicates to the application service (step 915). The application service communicates R' to the proximity token (step 920). Upon receipt of R', the proximity token employs a cryptographic technique on the modified result R' to obtain R" (e.g., using a cryptographic key shared by the smart card or a public key of the smart card) so as to validate the communication, and communicates R" to the application service (step 925). The application service in turn communicates R" to the smart card (step 930). The smart card employs a cryptographic technique upon R" to obtain R', thus verifying that the proximity token validated the communication (e.g., using a cryptographic key shared by the proximity token or a public key of the proximity token). As it was the smart card that formed R' from R, the smart card may reverse the process and recover R from R' using its own cryptographic keys. After recovering R, the smart card provides R to the application service (step 935).

Figure 10:
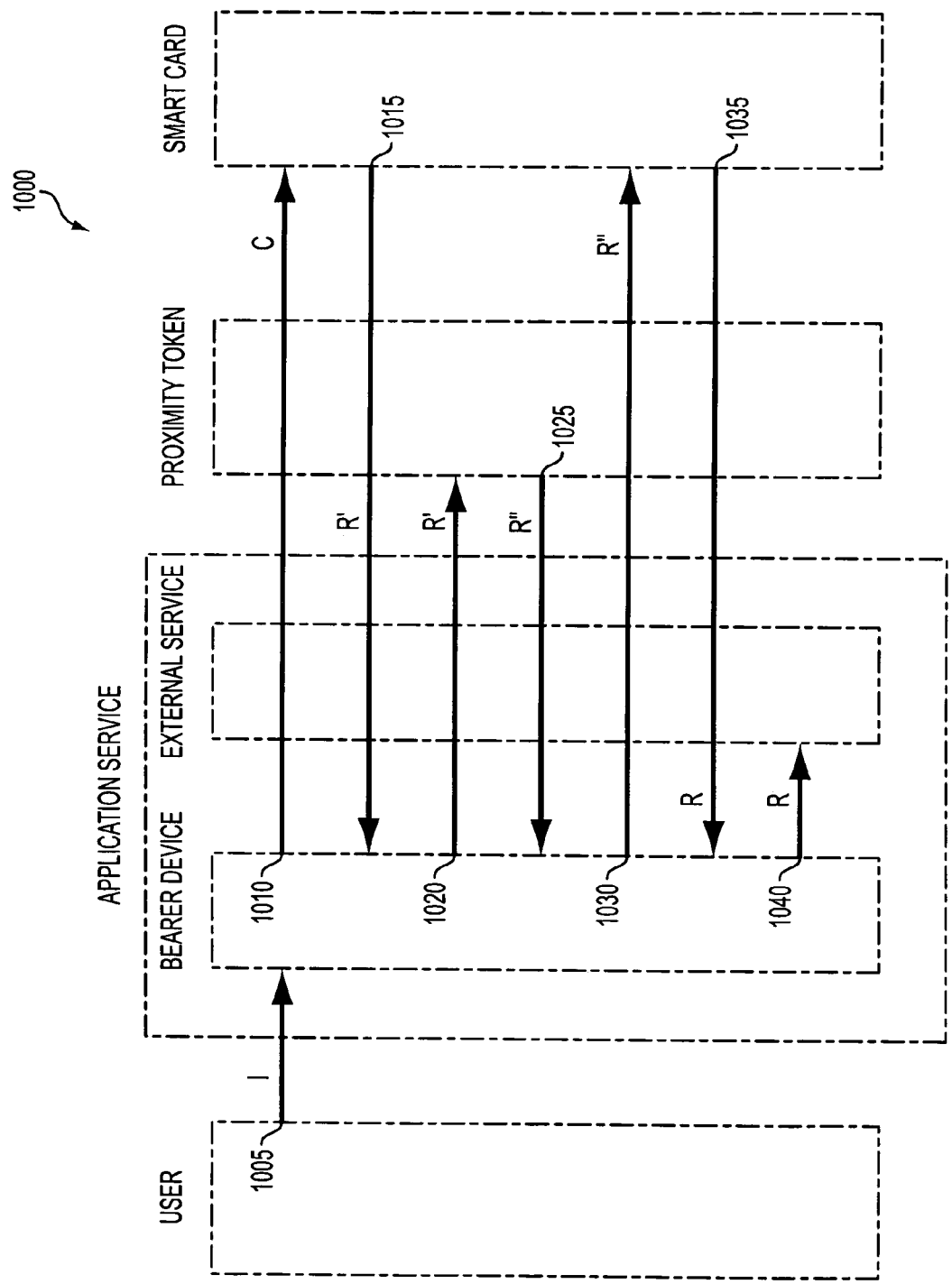

Referring to FIG. 10, a process 1000 is illustrated in which the application service includes a bearer device and an external service. A user provides an instruction I to the bearer device (1005). The bearer device generates a command C based on the instruction I, or, alternatively, based on its own initiative or upon some other input, and communicates C to the smart card (step 1010). The smart card executes the command C and generates a response R' that has been modified using an encryption technique, and that the smart card communicates to the bearer device (step 1015). The bearer device communicates R' to the proximity token (step 1020). Upon receipt of R', the proximity token employs a cryptographic technique upon the modified result R' to obtain R" (e.g., using a cryptographic key shared by the smart card or a public key of the smart card), thus validating the communication, and communicates R" to the bearer device (step 1025).

The bearer device in turn communicates R" to the smart card (step 1030). The smart card employs a cryptographic technique upon R" to obtain R', thus verifying that the proximity token validated the communication (e.g., using a cryptographic key shared by the proximity token or a public key of the proximity token). As it was the smart card initially that formed R' from R, the smart card also may reverse the process and recover R from R' using its own cryptographic keys. After recovering R, the smart card provides R to the bearer device (step 1035). The bearer device then communicates R to the external service, possibly using an encryption technique to secure that communication (step 1040). In addition, or in the alternative, R itself may represent already an encrypted message that may provide another layer of security an/or authentication, for example, by the external service.

Figure 11:
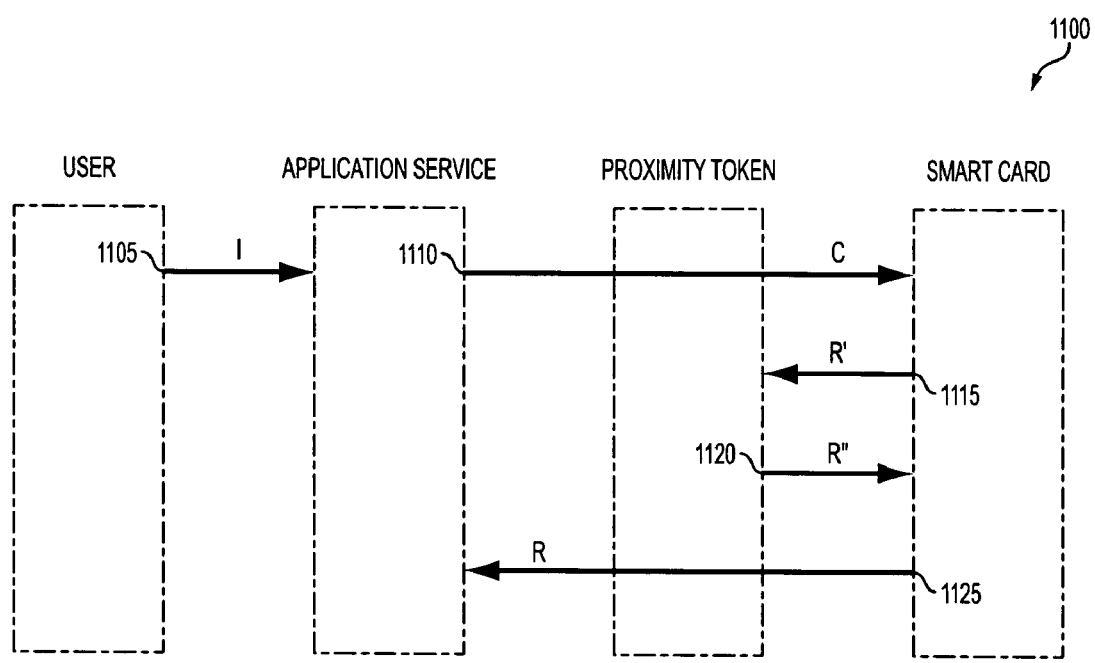

FIG. 11 illustrates a process 1100 in which a user may provide an instruction I to the application service (step 1105). The application service generates a command C based on the instruction I, or, alternatively, based on its own initiative or upon some other input, and communicates C to the smart card (step 1110). The smart card executes the command C and generates a response R', modified from R using an encryption technique, that the smart card communicates to the proximity token (step 1115). Upon receipt of R', the proximity token employs a cryptographic technique upon the modified result R' to obtain R" (e.g., using a cryptographic key shared by the smart card or a public key of the smart card), thus validating the communication, and communicates R" back to the smart card (step 1120). The smart card employs a cryptographic technique upon R" to obtain R', thus verifying that the proximity token validated the communication (e.g., using a cryptographic key shared by the proximity token or a public key of the proximity token). As it was the smart card that formed R' from R, the smart card may reverse the process and recover R from R' using its own cryptographic keys. After recovering R, the smart card provides R to the application service (step 1125).

Figure 12:
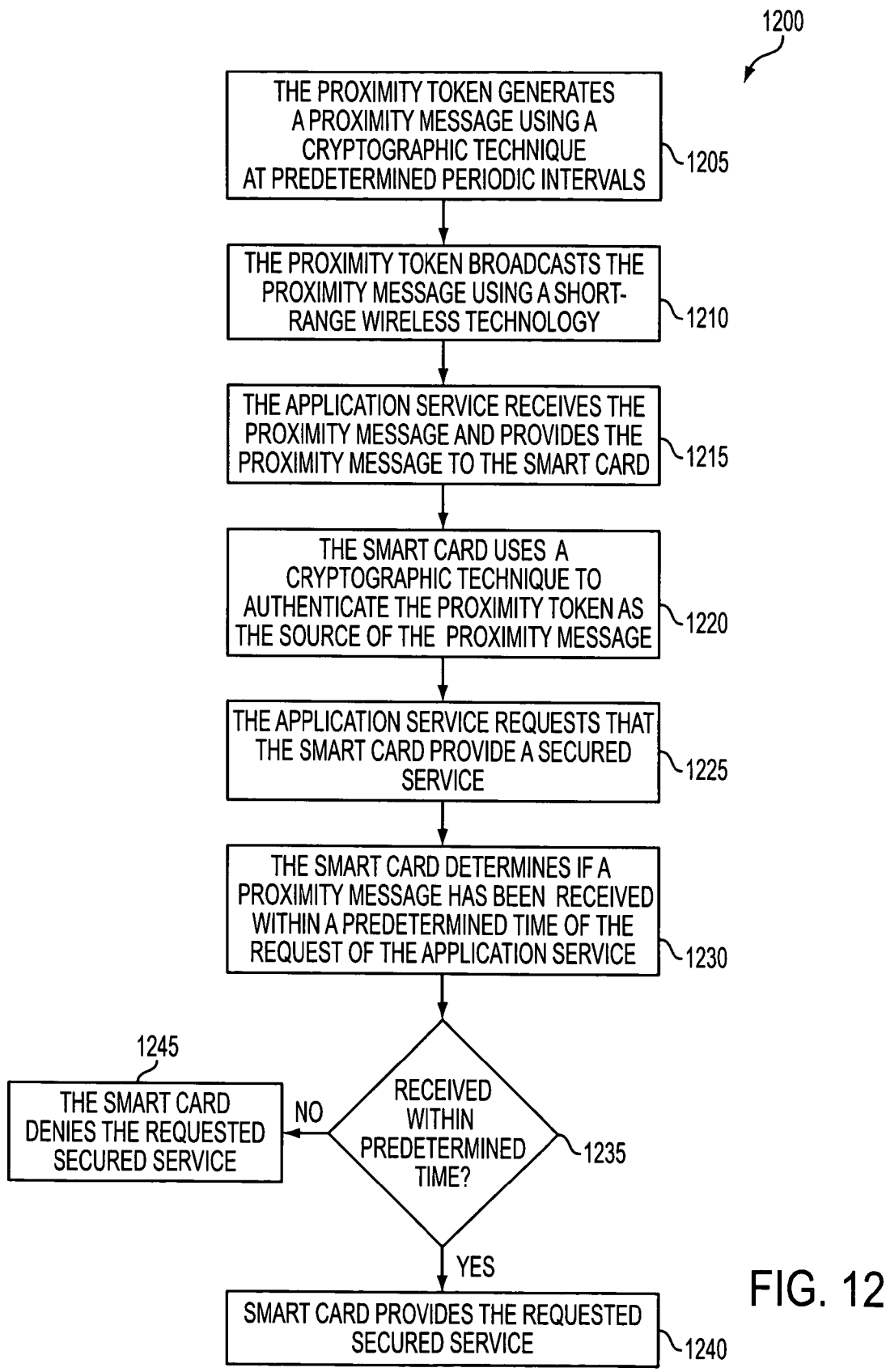
FIG. 12 is a flow diagram illustrating a process implementable by the systems of FIGS. 3-6.

Generally, any number of methods may be employed by which the proximity token validates the communication between the application service and the security token. For example, FIG. 12 illustrates a method 1200 that may be implemented using the systems of FIGS. 3-6, and in which the proximity token validates access to the application service by generating and broadcasting periodically a proximity message. More specifically, the proximity token initially generates a proximity message using a cryptographic technique (step 1205). The proximity token may generate the proximity message at predetermined periodic intervals (e.g., every five (5) seconds or every thirty (30) seconds). After the proximity message is generated, the proximity token broadcasts the proximity message using a short-range wireless technology to limit the region of validation (step 1210). The application service receives the proximity message and provides the proximity message to the smart card (step 1215). The smart card uses a cryptographic technique (e.g., using a cryptographic key shared by the proximity token or a public key of the proximity token) to verify the proximity token as the source of the proximity message (step 1220).

Independently, the application service requests that the smart card provide a secured service (step 1225). Upon receiving the request, the smart card determines if it has received an authenticated proximity message within a predetermined period of receiving the request of the application service (step 1230). If the smart card verifies that an authenticated proximity message has been received within that predetermined time (step 1235), the smart card provides the requested secured service (step 1240). Otherwise, the smart card denies the requested secured service (step 1245).

Other implementations are within the scope of the following claims.

What is claimed is:

1. A computer-implemented method comprising:
receiving an instruction at an application service;
generating a command at the application service based upon the instruction;
communicating the command to a security token;
modifying the command at the security token using a first cryptographic technique;
communicating the modified command from the security token to the application service;
communicating the modified command from the application service to a proximity token;
transforming the modified command at the proximity token using a second cryptographic technique;
communicating the transformed command from the proximity token to the application service;
communicating the transformed command from the application service to the security token;
recovering the modified command from the transformed command at the security token using a third cryptographic technique;
recovering the command from the recovered modified command at the security token using a fourth cryptographic technique;
executing the recovered command at the security token to produce a result; and
communicating the result from the security token to the application service.

2. The computer-implemented method of claim 1, wherein modifying the command at the security token using the first cryptographic technique further comprises digitally signing the command at the security token.

3. The computer-implemented method of claim 1, wherein modifying the command at the security token using the first cryptographic technique further comprises encrypting the command at the security token.

4. The computer-implemented method of claim 1, wherein modifying the command at the security token using the first cryptographic technique further comprises applying a hashing algorithm to the command at the security token.

5. The computer-implemented method of claim 1, wherein recovering the command from the transformed command at the security token using the third cryptographic technique further comprises recovering the command using a cryptographic key shared by the proximity token, or a public key of the security token.

6. The computer-implemented method of claim 1, wherein the application service is a mobile telephone, a personal digital assistant, a pen-based computer, a notebook computer, a desktop computer, a workstation, an automated teller machine, a security system, a web browser, an enterprise client, a subscriber identity module toolkit browser, an email client, a synchronization client, an electronic purse or wallet, an instant messaging client, a business productivity application, an operating system, or an operating system kernel.

7. The computer-implemented method of claim 1, wherein the command is communicated to the proximity token via a short message service (SMS) communication, a wireless application protocol (WAP) communication, a transport connection protocol (TCP) communication, an Internet protocol (IP) communication, a World Wide Web (WWW) communication, a local area network (LAN) communication, a wireless LAN (WLAN) communication, a wide area network (WAN) communication, a public switched telephone network (PTSN) communication, an integrated services digital network (ISDN) communication, a digital subscriber line (DSL) communication, an advanced mobile telephone service (AMPS) communication, a global system for mobile communications (GSM) communication, a general packet radio service (GPRS) communication, a code division multiple access (CDMA) communication, a wideband CDMA (WCDMA) communication, a universal mobile telecommunications system (UTMS) communication, a radio communication, a cable communication, or a satellite communication.

8. The computer-implemented method of claim 1, further comprising storing a secret cryptographic key within the security token.

9. The computer-implemented method of claim 1, wherein the transformed command is communicated from the proximity token to the application service if the proximity token is within a predetermined distance from the application service.

10. The computer-implemented method of claim 1, wherein the transformed command is communicated from the proximity token to the application service if the command is received from the application service above a predetermined power.

11. The computer-implemented method of claim 1, wherein the first and second cryptographic techniques are the same cryptographic techniques.

12. A computer-implemented method comprising:
receiving an instruction at an application service;
generating a command at the application service based upon the instruction;
communicating the command to a security token;
executing the command at the security token to produce a result;
modifying the result at the security token using a first cryptographic technique;
communicating the modified result from the security token to the application service;
communicating the modified result from the application service to a proximity token;
transforming the modified result at the proximity token using a second cryptographic technique;
communicating the transformed result from the proximity token to the application service;
communicating the transformed result from the application service to the security token;
recovering the modified result from the transformed result at the security token using a third cryptographic technique;
recovering the result from the recovered modified result at the security token using a fourth cryptographic technique; and
communicating the recovered result from the security token to the application service.

13. The computer-implemented method of claim 12, wherein modifying the result at the security token using the first cryptographic technique further comprises digitally signing the command at the security token.

14. The computer-implemented method of claim 12, wherein modifying the result at the security token using the first cryptographic technique further comprises encrypting the command at the security token.

15. The computer-implemented method of claim 12, wherein modifying the result at the security token using the first cryptographic technique further comprises applying a hashing algorithm to the command at the security token.

16. The computer-implemented method of claim 12, wherein recovering the result from the modified result at the security token using the third cryptographic technique further comprises recovering the result using a cryptographic key shared by the proximity token, or a public key of the proximity token.

17. The computer-implemented method of claim 12, wherein the application service is a mobile telephone, a personal digital assistant, a pen-based computer, a notebook computer, a desktop computer, a workstation, an automated teller machine, a security system, a web browser, an enterprise client, a subscriber identity module toolkit browser, an email client, a synchronization client, an electronic purse or wallet, an instant messaging client, a business productivity application, an operating system, or an operating system kernel.

18. The computer-implemented method of claim 12, wherein the command is communicated to the proximity token via a short message service (SMS) communication, a wireless application protocol (WAP) communication, a transport connection protocol (TCP) communication, an Internet protocol (IP) communication, a World Wide Web (WWW) communication, a local area network (LAN) communication, a wireless LAN (WLAN) communication, a wide area network (WAN) communication, a public switched telephone network (PTSN) communication, an integrated services digital network (ISDN) communication, a digital subscriber line (DSL) communication, an advanced mobile telephone service (AMPS) communication, a global system for mobile communications (GSM) communication, a general packet radio service (GPRS) communication, a code division multiple access (CDMA) communication, a wideband CDMA (WCDMA) communication, a universal mobile telecommunications system (UTMS) communication, a radio communication, a cable communication, or a satellite communication.

19. The computer-implemented method of claim 12, further comprising storing a secret cryptographic key within the security token.

20. The computer-implemented method of claim 12, wherein the transformed result is communicated from the proximity token to the application service if the proximity token is within a predetermined distance from the application service.

21. The computer-implemented method of claim 12, wherein the transformed result is communicated from the proximity token to the application service if the command is received from the application service above a predetermined power.

22. The computer-implemented method of claim 12, wherein the first, second, third and/or fourth cryptographic techniques are the same cryptographic techniques.

23. A system comprising:
an application service, the application service:
  receiving an instruction,
  generating a command based upon the instruction,
  communicating the command,
  receiving a modified command,
  communicating the modified command,
  receiving a transformed command, and
  communicating the transformed command;
a security token, the security token:
  receiving the command from the application service,
  modifying the command using a first cryptographic technique,
  communicating the modified command to the application service,
  receiving the transformed command from the application service, recovering the modified command from the transformed command using a third cryptographic technique, recovering the command from the recovered modified command using a fourth cryptographic technique, executing the recovered command to produce a result, and communicating the result to the application service; and a proximity token, the proximity token:

receiving the modified command from the application service, transforming the modified command using a second cryptographic technique, and communicating the transformed command to the application service.

24. A system comprising:

an application service, the application service:

receiving an instruction, generating a command based upon the instruction, communicating the command, receiving a modified result, communicating the modified result, receiving a transformed result, and communicating the transformed result; and a security token, the security token:

receiving the command from the application service, executing the command to produce a result, modifying the result using a first cryptographic technique, communicating the modified result to the application service, receiving the transformed result from the application service, recovering the modified result from the transformed result using a third cryptographic technique, recovering the result from the recovered modified result using a fourth cryptographic technique, and communicating the recovered result to the application service; and a proximity token, the proximity token:

receiving the modified result from the application service, transforming the modified result using a second cryptographic technique, and communicating the transformed result to the application service.

* * * * *